(12) United States Patent
Lesnau, IV et al.

(10) Patent No.: US 8,950,754 B2
(45) Date of Patent: Feb. 10, 2015

(54) CYLINDER HEAD GASKET

(75) Inventors: Edward Lesnau, IV, Livonia, MI (US); Christopher Lafrenz, Shelby Township, MI (US)

(73) Assignee: Federal-Mogul Corporation, Southfield, MI (US)

( * ) Notice: Subject to any disclaimer, the term of this patent is extended or adjusted under 35 U.S.C. 154(b) by 417 days.

(21) Appl. No.: 13/412,139

(22) Filed: Mar. 5, 2012

(65) Prior Publication Data

US 2012/0223486 A1 Sep. 6, 2012

Related U.S. Application Data

(60) Provisional application No. 61/448,934, filed on Mar. 3, 2011.

(51) Int. Cl.
*F02F 11/00* (2006.01)
*F16J 15/08* (2006.01)

(52) U.S. Cl.
CPC .......... *F16J 15/0825* (2013.01); *F16J 15/0887* (2013.01); *F16J 2015/0868* (2013.01)
USPC ....................................................... 277/593

(58) Field of Classification Search
CPC . F16J 15/0815; F16J 15/0825; F16J 15/0831; F16J 15/0881; F16J 15/0887
USPC ....................................................... 277/593
See application file for complete search history.

(56) References Cited

U.S. PATENT DOCUMENTS

| | | | |
|---|---|---|---|
| 4,468,044 A * | 8/1984 | Ulmer et al. ................... | 277/596 |
| 4,721,315 A | 1/1988 | Ueta | |
| 5,957,463 A | 9/1999 | Inamura | |
| 6,019,376 A | 2/2000 | Miyaoh | |
| 6,139,025 A | 10/2000 | Miyaoh | |
| 6,283,480 B1 * | 9/2001 | Miura et al. ................... | 277/593 |
| 6,431,554 B1 | 8/2002 | Miyamoto et al. | |
| 6,926,282 B2 | 8/2005 | Werz et al. | |
| 7,497,442 B2 | 3/2009 | Fukai | |
| 7,726,662 B2 * | 6/2010 | Foster ............................ | 277/592 |
| 7,959,160 B2 * | 6/2011 | Murata et al. .................. | 277/592 |
| 2003/0168818 A1 * | 9/2003 | Pepin ............................. | 277/593 |
| 2006/0017232 A1 | 1/2006 | Udagawa | |
| 2009/0189359 A1 * | 7/2009 | Yoshijima et al. ............. | 277/591 |
| 2010/0326380 A1 * | 12/2010 | Fedeson et al. ........ | 123/41.82 R |

OTHER PUBLICATIONS

International Search Report (PCT/US2012/027654) mailed on May 31, 2012.

* cited by examiner

*Primary Examiner* — Vishal Patel
(74) *Attorney, Agent, or Firm* — Robert L. Stearns; Dickinson Wright, PLLC

(57) ABSTRACT

A multilayer gasket assembly includes a functional layer having a plurality of openings bounded by an annular free edge. The functional layer has a seal bead bounding the openings. The assembly further includes a stopper layer having a free outer periphery and openings configured to register with the openings of the functional layer. The stopper layer has at least one nonsymmetrical, irregularly shaped ear extending radially outwardly from at least one the openings to form a portion of the free outer periphery.

13 Claims, 3 Drawing Sheets

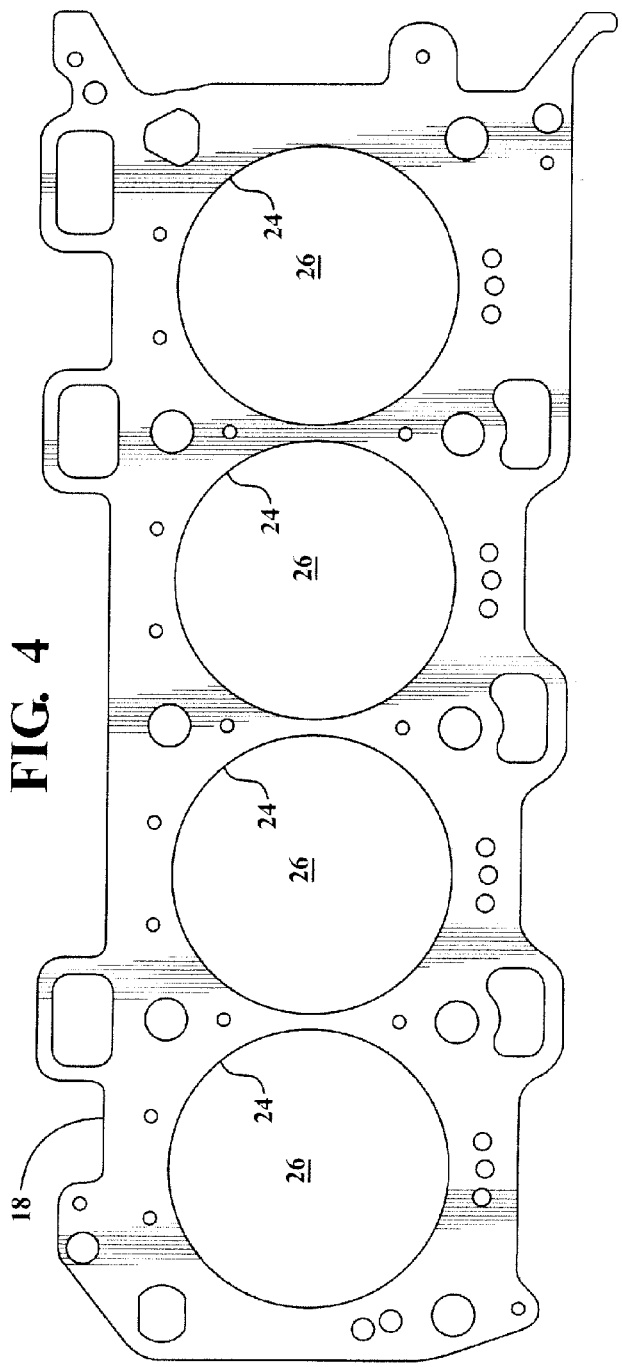
FIG. 4
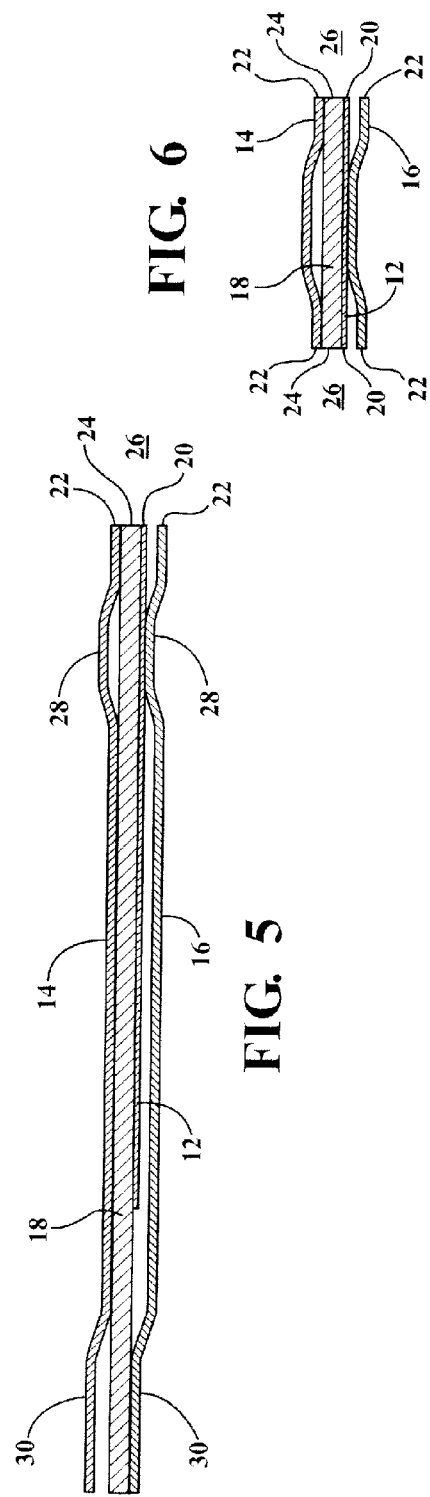
FIG. 6
FIG. 5

CYLINDER HEAD GASKET

CROSS-REFERENCE TO RELATED APPLICATION

This application claims the benefit of U.S. Provisional Application Ser. No. 61/448,934, filed Mar. 3, 2011, which is incorporated herein by reference in its entirety.

BACKGROUND OF THE INVENTION

1. Technical Field

This invention relates generally to static gaskets of the type used to establish a gas/fluid-tight seal between two members to be clamped together, and more particularly to multilayer static gaskets, such as a cylinder head gasket.

2. Related Art

In establishing a gas/fluid-tight seal between two members to be clamped together, such as between a cylinder head and cylinder block, it is common to use a static cylinder head gasket having multiple layers. Generally, at least one of the layers of the multilayer gasket, sometimes referred to as a functional layer, has a seal bead or beads to facilitate establishing a fluid tight seal. Another of the layers, sometimes referred to as a distance layer, is configured to abut the function layer to facilitate establishing the fluid tight seal. Further yet, a stopper layer can be provided to facilitate establishing a fluid tight seal across the seal bead or beads. Upon being installed, contact stresses are typically established across the beads, wherein the contact stresses extend up to the opening, e.g. cylinder bore, being sealed. Unfortunately, although being able to facilitate providing a reliable seal across the beads, known configurations of the stopper layer can contribute to bending of the cylinder head and/or cylinder block. This is particularly troublesome in regions of unsupported gaps between layers of the gasket, such as between opposing functional layers.

SUMMARY OF THE INVENTION

A multilayer gasket assembly includes a functional layer having a plurality of openings bounded by an annular free edge. The functional layer has a seal bead bounding the openings. The assembly further includes a stopper layer having a free outer periphery and openings configured to register with the openings of the functional layer. The stopper layer has at least one nonsymmetrical, irregularly shaped ear extending radially outwardly from at least one the openings to form a portion of the free outer periphery.

In accordance with another aspect of the invention, the stopper layer openings are aligned in series along a straight axis to provide opposite end openings with at least one intermediate opening located between the opposite end openings. The free outer periphery of the at least one intermediate opening is free of the ears.

In accordance with another aspect of the invention, the stopper layer has a plurality of the intermediate openings free of the ears.

In accordance with another aspect of the invention, the free outer periphery is spectacle-shaped about the intermediate openings.

In accordance with another aspect of the invention, the stopper layer has a substantially constant width extending about the intermediate openings.

In accordance with another aspect of the invention, the stopper layer has a plurality of the ears with at least some of the ears being shaped differently from one another.

In accordance with another aspect of the invention, the stopper layer has an axis of symmetry.

In accordance with another aspect of the invention, a multilayer gasket assembly includes a functional layer having a plurality of openings bounded by an annular free edge. The assembly further includes a stopper layer having a free outer periphery and openings configured to register with the openings of the functional layer. The stopper layer openings are aligned in series along a straight axis to provide opposite end openings with at least one intermediate opening located between the opposite end openings. At least one ear extends radially outwardly from at least one the opposite end openings to form a portion of the free outer periphery with the free outer periphery of at least one of the intermediate opening being free of an ear.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 4 is a plan view of a distance layer of the multilayer gasket assembly of FIG. 1;

FIG. 5 is cross-sectional view of the multilayer gasket assembly taken generally along line 5-5 of FIG. 1; and FIG. 6 is cross-sectional view of the multilayer gasket assembly taken generally along line 6-6 of FIG. 1.

DETAILED DESCRIPTION OF PRESENTLY PREFERRED EMBODIMENTS

Figure 1:
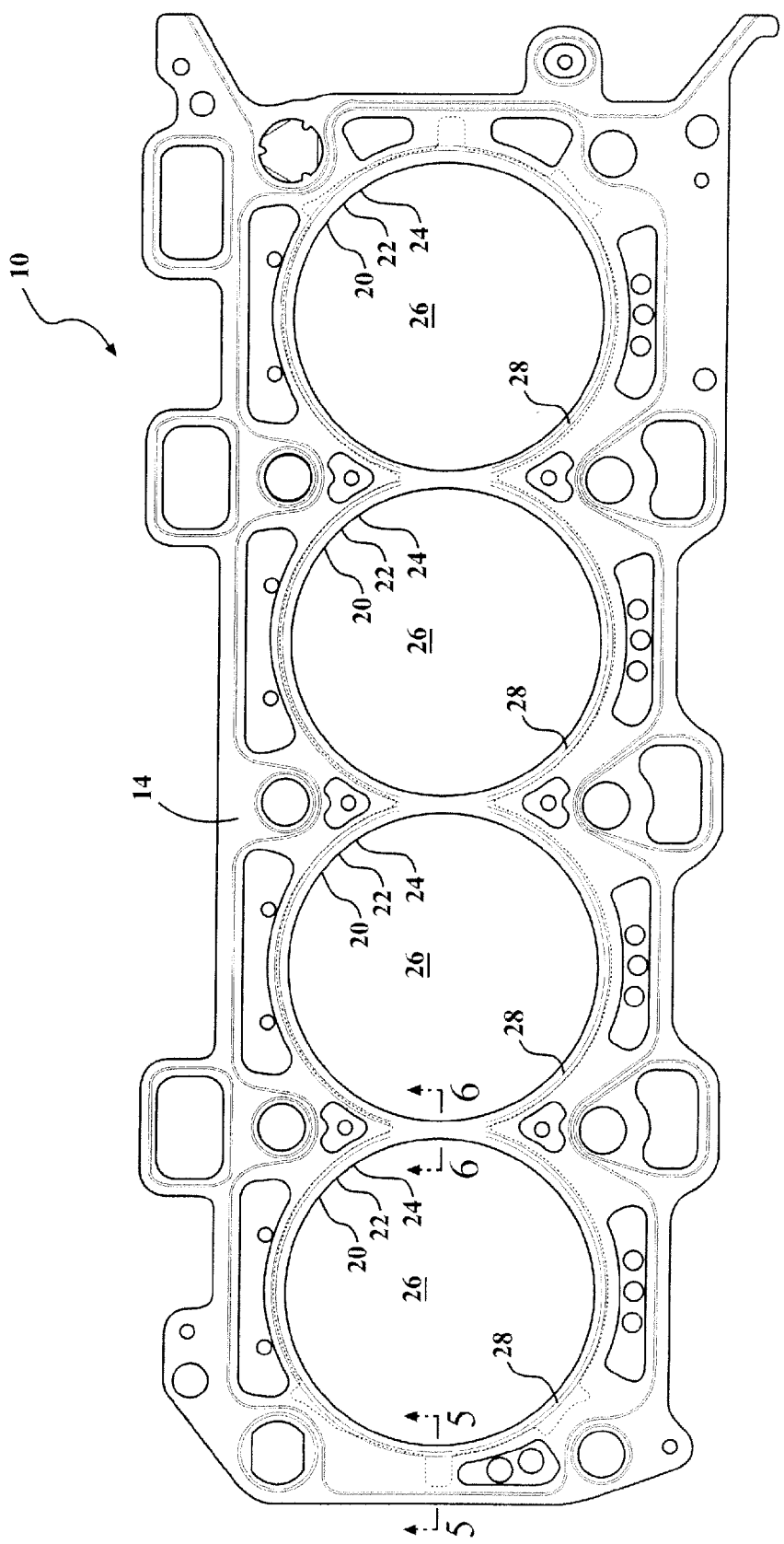
FIG. 1 is a plan view of a multilayer gasket assembly constructed in accordance with one aspect of the invention.
Figure 2:
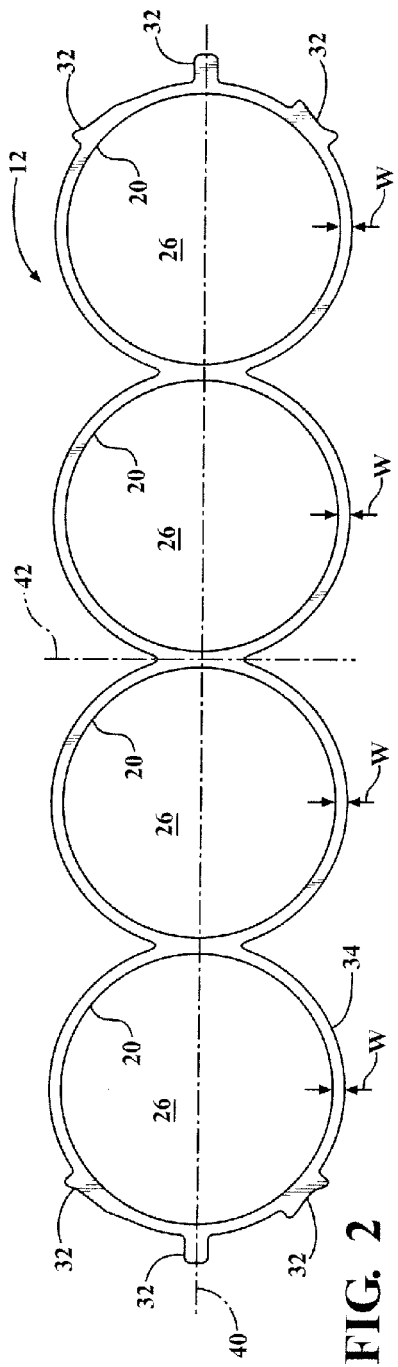
FIG. 2 is a plan view of a stopper layer of the multilayer gasket assembly of FIG. 1.
Figure 3:
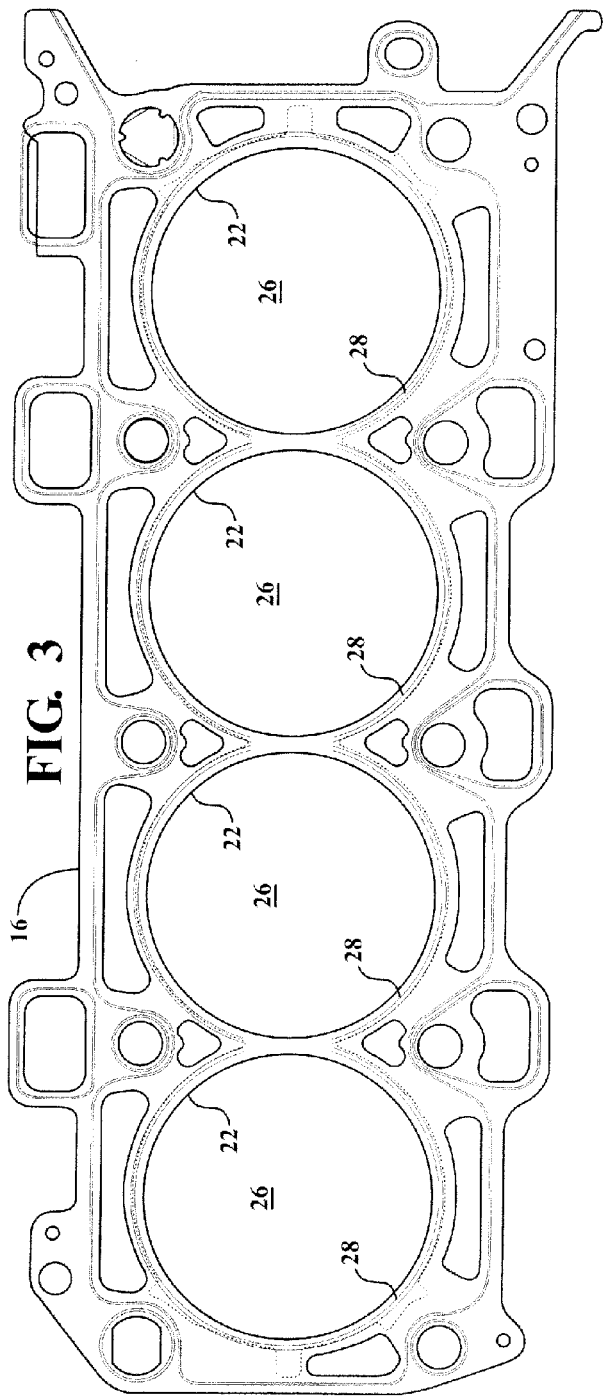
FIG. 3 is a plan view of a functional layer of the multilayer gasket assembly of FIG. 1.

Referring in more detail to the drawings, FIG. 1 illustrates a multilayer cylinder head gasket assembly, referred to hereafter as assembly 10, constructed in accordance with one embodiment of the invention. In FIG. 2, a stopper layer 12, constructed in accordance with one aspect of the invention, of assembly 10 is shown. The assembly 10, in addition to the stopper layer 12, includes at least one functional layer 14, 16 (FIG. 3), and shown here by way of example, as a plurality of functional layers 14, 16 (FIGS. 5 and 6). Further, the assembly 10 can include an optional distance layer 18 sandwiched between at least one of the functional layers 14, 16 and the stopper layer 12 (FIGS. 4, 5 and 6). Accordingly, the functional layers 14, 16 are arranged on opposite sides of the distance layer 18, if included, and the stopper layer 12 is arranged between at least one of the functional layers, shown here as the lower functional layer 16 and the distance layer 18.

The stopper layer 12, functional layers 14, 16 and distance layer 18 each have an annular free edge 20, 22, 24, respectively, bounding a common opening 26, such as a combustion chamber opening configured to register with a cylinder bore of an internal combustion engine. The free edges 20, 22, 24 are configured to be axially aligned (axially herein is intended to be with reference to a central axis of the opening 26) and substantially flush with one another upon being compressed between a cylinder head and cylinder block. At least one, and shown here as both the functional layers 14, 16, have full beads 28 extending circumferentially about a respective one of the openings 26. Further, half beads 30 are also provided radially outwardly from the full beads 28. To facilitate forming a gas-tight/fluid-tight seal about the openings 26 between the full beads 28 and the abutting cylinder head and cylinder block, while at the same time inhibiting undesirable bending of the cylinder head and the engine block, the stopper layer 12 has at least one, and shown as a plurality of nonsymmetrical, irregularly shaped tabs, also referred to as ears 32. The ears 32 extend radially outwardly from at least one of the openings 26 to form a portion of a free outer periphery 34 of the stopper layer 12. As such, as a result of the ears 32, upon tightening fasteners extending through fastener openings, the cylinder head and engine block retain or substantially retain their intended configuration, thereby preventing the onset of head bending and/or cam journal distortion.

The stopper layer 12 is provided having a uniform or substantially uniform width (w) about the openings 26, with the exception of the regions including the ears 32. In the regions of the ears 32, the ears 32 extend radially outwardly beyond the regions of uniform width w. In the embodiment illustrated, the openings 26 of the stopper layer 12 are aligned in series along a straight axis 40 to provide opposite end openings 26 with at least one, and shown by way of example, as a plurality of intermediate opening 26 located between the opposite end openings 26. The free outer periphery 34 of the intermediate opening 26 are shown as being free of the radially outwardly extending ears 32, and thus, the intermediate portion bounding the intermediate openings 26 have the uniform and constant width w, such that the free outer periphery 34 is purely spectacle-shaped about the intermediate openings 26.

In contrast with the intermediate portion of the stopper layer 12, at least one, and shown as each opposite end 36, 38, has at least one ear 32 extending therefrom. Each opposite end 36, 38 is shown as having a plurality of the ears 32, wherein the plurality of ears 32 extending from each end 36, 38 are shaped differently from one another. The ears 32 at each end 36, 38, although shaped differently from one another, are shaped the same at both ends 36, 38 such that the stopper layer 12 has an axis of symmetry 42 extending transversely to the straight axis 40 and bisecting the intermediate openings 26.

The functional layers 16, 18 are constructed from a resilient metal, such as spring steel, for example, and can be provided having a thickness as desired for the intended application. The functional layers 12, 14 each have generally planar main body portions extending along a plane, with the full beads 28 extending axially outwardly from the planar body. The full beads 28 of the functional layers 14, 16 in the embodiment shown are arranged in mirrored relation to one another across the opposite sides of the distance layer 14, by way of example.

The distance layer 18 can be constructed from a relatively rigid metal material, such as cold rolled steel or stainless steel, for example. The distance layer 18 can be constructed having a generally flat, planar body, and thus, is economical in manufacture.

Accordingly, as discussed above, the ears 32 prevent the cylinder head and engine block from bending upwardly and/or downwardly over the entire area of the stopper layer 12 by occupying space between the functional layers 14, 16 and the distance layer 14 that would otherwise be present in the absence of the ears 32. Of course, separate pieces of the material, or separate features could be provided in the distance layer 18, however, this would come at a cost, such as via additional manufacturing processes and/or material. Accordingly, by providing the ears 28 as a monolithic piece of material with the stopper layer 12, manufacturing efficiencies are gained, and thus, costs are reduced. This results because the ears 32 are formed as an extension of the flat piece of stopper layer 12 material, as needed, depending on the overall configuration of the gasket assembly 10.

Obviously, many modifications and variations of the present invention are possible in light of the above teachings. It is, therefore, to be understood that within the scope of the appended claims, the invention may be practiced otherwise than as specifically described.

What is claimed is:

1. A multilayer gasket assembly, comprising:
a functional layer having a plurality of openings bounded by an annular free edge, said functional layer having a seal bead bounding said openings;
a stopper layer having a free outer periphery and openings configured to register with said openings of said functional layer, said stopper layer openings being aligned in series along a straight axis to provide opposite end openings with at least one intermediate opening located between said opposite end openings; and
a plurality of nonsymmetrical, irregularly shaped ears having purely planar surfaces extending radially outwardly from said outer periphery of said opposite end openings to form a portion of said free outer periphery, said outer periphery of said at least one intermediate opening being free of said ears, with at least some of said ears being shaped differently from one another and wherein said stopper layer has an axis of symmetry.

2. The multilayer gasket assembly of claim 1 wherein said free outer periphery is spectacle-shaped about said intermediate openings.

3. The multilayer gasket assembly of claim 1 wherein said stopper layer has a substantially constant width extending about said intermediate openings.

4. The multilayer gasket assembly of claim 1 further including a distance layer having an opening configured to register with said opening of said functional layer.

5. The multilayer gasket assembly of claim 4 wherein said distance layer is sandwiched between said functional layer and said stopper layer.

6. The multilayer gasket assembly of claim 1 wherein said axis of symmetry extends generally transversely to said straight axis.

7. A multilayer gasket assembly, comprising:
a functional layer having a plurality of openings bounded by an annular free edge;
a stopper layer having a free outer periphery and openings configured to register with said openings of said functional layer, said stopper layer openings being aligned in series along a straight axis to provide opposite end openings with at least one intermediate opening located between said opposite end openings, said free outer periphery forming generally v-shaped regions between adjacent openings; and
a plurality of ears extending radially outwardly from said opposite end openings to form a portion of said free outer periphery with said generally v-shaped regions and said free outer periphery of said at least one intermediate opening being free of said ears.

8. The multilayer gasket assembly of claim 7 wherein said stopper layer has a plurality of said intermediate openings, said plurality of intermediate openings being free of said ear.

9. The multilayer gasket assembly of claim 8 wherein said free outer periphery is spectacle-shaped about said intermediate openings.

10. The multilayer gasket assembly of claim 9 wherein said stopper layer has a substantially constant width extending about said intermediate openings.

11. The multilayer gasket assembly of claim 7 wherein at least some of said ears are shaped differently from one another.

12. The multilayer gasket assembly of claim 7 further including a distance layer having an opening configured to register with said opening of said functional layer.

13. The multilayer gasket assembly of claim 12 wherein said distance layer is sandwiched between said functional layer and said stopper layer.

\* \* \* \* \*